US006732210B1

(12) United States Patent
Mathieson (10) Patent No.: US 6,732,210 B1
(45) Date of Patent: May 4, 2004

(54) COMMUNICATION BUS FOR A MULTI-PROCESSOR SYSTEM (75) Inventor: John G. Mathieson, Los Gatos, CA (US)

(73) Assignee: Genesis Microchip INC, Alviso, CA (US)

( * ) Notice: Subject to any disclaimer, the term of this patent is extended or adjusted under 35 U.S.C. 154(b) by 0 days.

(21) Appl. No.: 09/476,946

(22) Filed: Jan. 3, 2000

(51) Int. Cl.$^7$ ................................................. G06F 13/14
(52) U.S. Cl. ...................................... 710/241; 710/113
(58) Field of Search ................................. 710/107–125, 710/240–244, 113–118

(56) References Cited

U.S. PATENT DOCUMENTS

| | | | | | |
|---|---|---|---|---|---|
| 4,698,746 | A | * | 10/1987 | Goldstein | 710/113 |
| 5,257,356 | A | * | 10/1993 | Brockmann et al. | 710/110 |
| 5,329,630 | A | * | 7/1994 | Baldwin | 711/173 |
| 5,379,440 | A | * | 1/1995 | Kelly et al. | 712/12 |
| 5,455,912 | A | * | 10/1995 | Ludwig | 710/113 |
| 5,809,538 | A | * | 9/1998 | Pollmann et al. | 345/520 |
| 5,862,356 | A | * | 1/1999 | Normoyle et al. | 710/116 |
| 5,878,274 | A | * | 3/1999 | Kono et al. | 340/500 |
| 5,918,055 | A | * | 6/1999 | Crawford et al. | 710/240 |
| 5,933,616 | A | * | 8/1999 | Pecone et al. | 710/240 |
| 5,983,301 | A | * | 11/1999 | Baker et al. | 710/113 |
| 6,021,455 | A | * | 2/2000 | Kondo et al. | 710/241 |
| 6,104,876 | A | * | 8/2000 | Daum et al. | 710/107 |
| 6,105,083 | A | * | 8/2000 | Kurtze et al. | 710/106 |
| 6,161,160 | A | * | 12/2000 | Niu et al. | 710/310 |

* cited by examiner

*Primary Examiner*—Paul R. Myers
(74) *Attorney, Agent, or Firm*—Beyer Weaver & Thomas LLP (57) ABSTRACT

In accordance with the invention, a multi-processing unit system including a plurality of processing units in direct communication via a communication bus is presented. The system includes a communication bus arbiter having a communication packet multiplexer. Each of the processing units include a communication bus interface comprising a transmitter interface and a receiver interface. Each of the transmitter interfaces are connected to the communication packet multiplexer of the communication bus arbiter via separate 32-bit interfaces. Each of the receiver interfaces is connected to the communication packet multiplexer of the communication bus arbiter via a single 32-bit bus. The system may further comprise a first control signal connection means for communicating control signals between the transmitter interface and the communication bus arbiter and a second control signal connection means for communicating control signal between the receiver interface and the communication bus arbiter.

14 Claims, 5 Drawing Sheets

COMMUNICATION BUS FOR A MULTI-PROCESSOR SYSTEM

BACKGROUND OF THE INVENTION

The present invention relates generally to a multiple processing unit system in which the processing units can communicate directly with each other, and more particularly to a novel communication bus and bus protocol which facilitates communication between processing units.

Multi-processor or multi-processing unit systems are well known in the art. To fully utilize the benefits of having multiple processing units working in parallel, the processing units should communicate with one another. However, most bus structures connecting multiple processing units are designed to allow the processing units to share memory, not communicate directly. That is, the busses are memory busses, not communication busses. Memory busses are configured to handle bursts of data efficiently, such as cache lines or other data blocks. In designs in which the memory bus is used to connect processing units to DRAM memory, it also is important to perform longer bursts of data transfer for efficiency, as DRAM has a set-up overhead when accessing an address which is not adjacent to a previously accessed address. This burst nature gives the bus higher bandwidth at a cost of higher latencies.

In certain situations, it is important to have low latency transfers. For example, in a multi-media system performing a 3D pixel rendering function, one processing unit may be configured to process a list of geometry coordinates, while another processing unit may be configured to render the scene on a video display. With the current systems, the first processing unit writes the geometry coordinates to memory, and then the second processing unit pulls the coordinates out of memory to render the scene. With this configuration, the memory buffer decouples the two processes, creating latencies caused by writing data to and reading data from the memory. These latencies reduce the true parallel processing benefits from the multi-processing unit system, because the second processing unit is delayed in rendering the 3D scene. To more efficiently process the data, it is preferable for the first processing unit to pass the data directly to the second processing unit to avoid the memory latencies. That way, the second processing unit can perform the rendering process as soon as possible.

Thus, what is needed is a communication bus and associated protocol that facilitates low latency transfers between multiple processing units.

SUMMARY OF THE INVENTION

In accordance with the invention, a multi-processing unit system including a plurality of processing units in direct communication via a communication bus is presented. The system includes a communication bus arbiter having a communication packet multiplexer. Each of the processing units includes a communication bus interface comprising a transmitter interface and a receiver interface. Each of the transmitter interfaces is connected to the communication packet multiplexer of the communication bus arbiter via separate 32-bit interfaces. Each of the receiver interfaces is connected to the communication packet multiplexer of the communication bus arbiter via a single 32-bit bus.

The system may further comprise a first control signal connection means for communicating control signals between the transmitter interface and the communication bus arbiter and a second control signal connection means for communicating control signal between the receiver interface and the communication bus arbiter. In accordance with one embodiment of the present invention, the first control signal connection means comprises two 1-bit communication connections, one for communicating bus request signals from the transmitter interface to the communication bus arbiter, and the other for communicating bus request acknowledgment signals from the communication bus arbiter to the transmitter interface. Similarly, the second control signal connection means preferably comprises two 1-bit communication connections, one form communicating receiver buffer full signals from the receiver interface to the communication bus arbiter, and the other for communicating receive packet enable signals from the communication bus arbiter to the receiver interface.

In accordance with one embodiment of the present invention, the processing units preferably communicate with one another using communication packets comprising a 32-bit header and a 128-bit data packet. The 128-bit data packet preferably is presented as 4 32-bit data packets.

The present invention further comprises a novel communication protocol for communicating data packets between the processing units over the communication bus. In accordance with one embodiment of the protocol or the present invention, a first processing unit sends a bus request to a bus arbiter. If the communication bus is open for communication, the bus arbiter grants the first processing unit access to the bus. The first processing unit then sends a header packet to the bus arbiter, which includes a target ID. The bus arbiter takes the target ID and determines if a second processing unit associated with the target ID is able to receive data from the first processing unit. If the second processing unit is able to receive data, the first processing unit sends a 128-bit data packet to the bus arbiter, which in turn, sends the data packet to the second processing unit. In accordance with one embodiment of the present invention, the 128-bit data packet is sent in 4 separate 32-bit packets. It typically takes 5 clock cycles to send the 128 bits of data to the second processing unit.

A more complete understanding of the present invention may be derived by referring to the detailed description of preferred embodiments and claims when considered in connection with the figures, wherein like reference numbers refer to similar items throughout the figures.

DESCRIPTION OF THE SPECIFIC EMBODIMENTS

The present invention relates generally to a multiple processing unit system in which the processing units can communicate directly with each other, and more particularly to a novel communication bus and bus protocol which facilitates communication between processing units.

The communication bus and associated protocol of the present invention may be used in any multi-processing unit system. However, in accordance with one embodiment of the invention, and for purposes of example, the communication bus and protocol will be described herein with reference to a particular multi-media processing system comprising a plurality of processing units.

Figure 1:
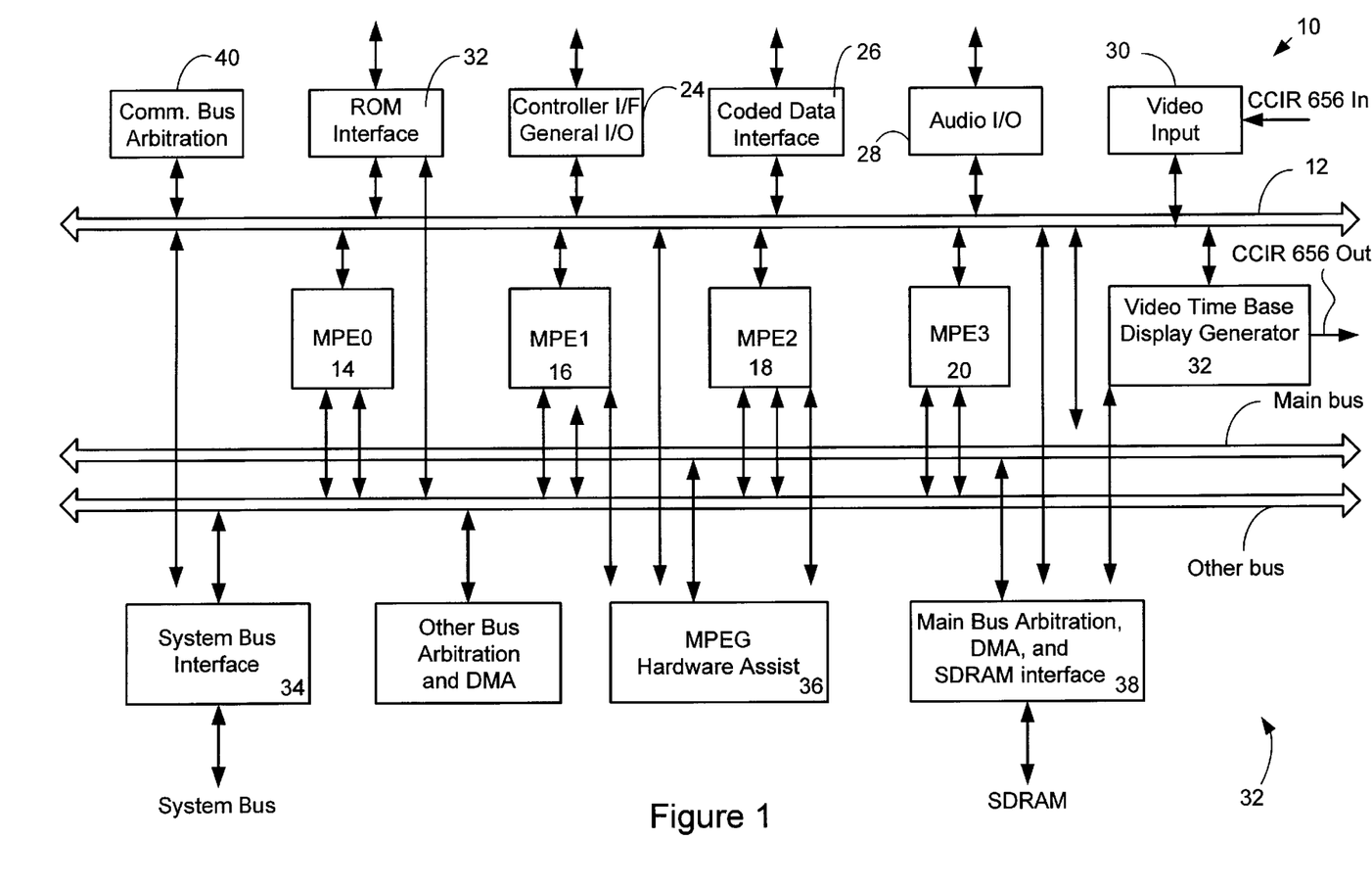
FIG. 1 is a block diagram of a multi-processing unit system utilizing a communication bus in accordance with the present invention.

Referring now to FIG. 1, a multi-processing unit system 10 comprising a communication bus 12 (hereinafter referred to as "comm bus 12") is shown. In accordance with the illustrated embodiment, a plurality of processing units 14–38 are connected to comm bus 12. In addition, as discussed in more detail below, a comm bus arbiter 40 is connected to or is part of comm bus 12, and is configured to facilitate data transfers over comm bus 12.

Comm bus 12 is configured to allow multiple processing units to communicate directly with each other. In accordance with this aspect of the present invention, any number of different processing units can be connected to comm bus 12. For example, processors, ROM and/or RAM interfaces, system bus interfaces, peripheral device interfaces, audio and/or video I/O units, ASIC and/or co-processor units may be connected to comm bus 12. As illustrated in FIG. 1, multi-media processing system 10 comprises a variety of different processing units connected to comm bus 12. In accordance with the illustrated embodiment, four media processing elements (MPEs) 14–20 are connected to comm bus 12. The MPEs are configured to perform the majority of data processing for system 10. In addition, other processing units connected to comm bus 12 include a ROM interface device 22, a peripheral device I/O interface 24, a coded data (i.e. MPEG data) interface 26, an audio I/O unit 28, a video input unit 30, a video display generator 32, a system bus interface 34, an MPEG hardware assist unit 36 and a DRAM interface/DMA unit 38. As discussed in more detail below, processing units 14–38 can communicate directly with each other over comm bus 12 using a suitable comm bus protocol as described herein. For a more detailed discussing of the configuration and operation of systems 10, see U.S. patent application Ser. No. 09/476,761, filed Jan. 3, 2000, and entitled "A Media Processing System and Method," the entirety of which is incorporated herein by reference for all purposes. In addition, while FIG. 1 illustrates one embodiment of a system having a number of different types of processing units connected to comm bus 12, one skilled in the art will appreciate that comm bus 12 can be configured within any number of different systems, for connecting a variety of different processing units and unit types. Therefore, the present invention is not limited to the illustrated embodiment.

Figure 2:
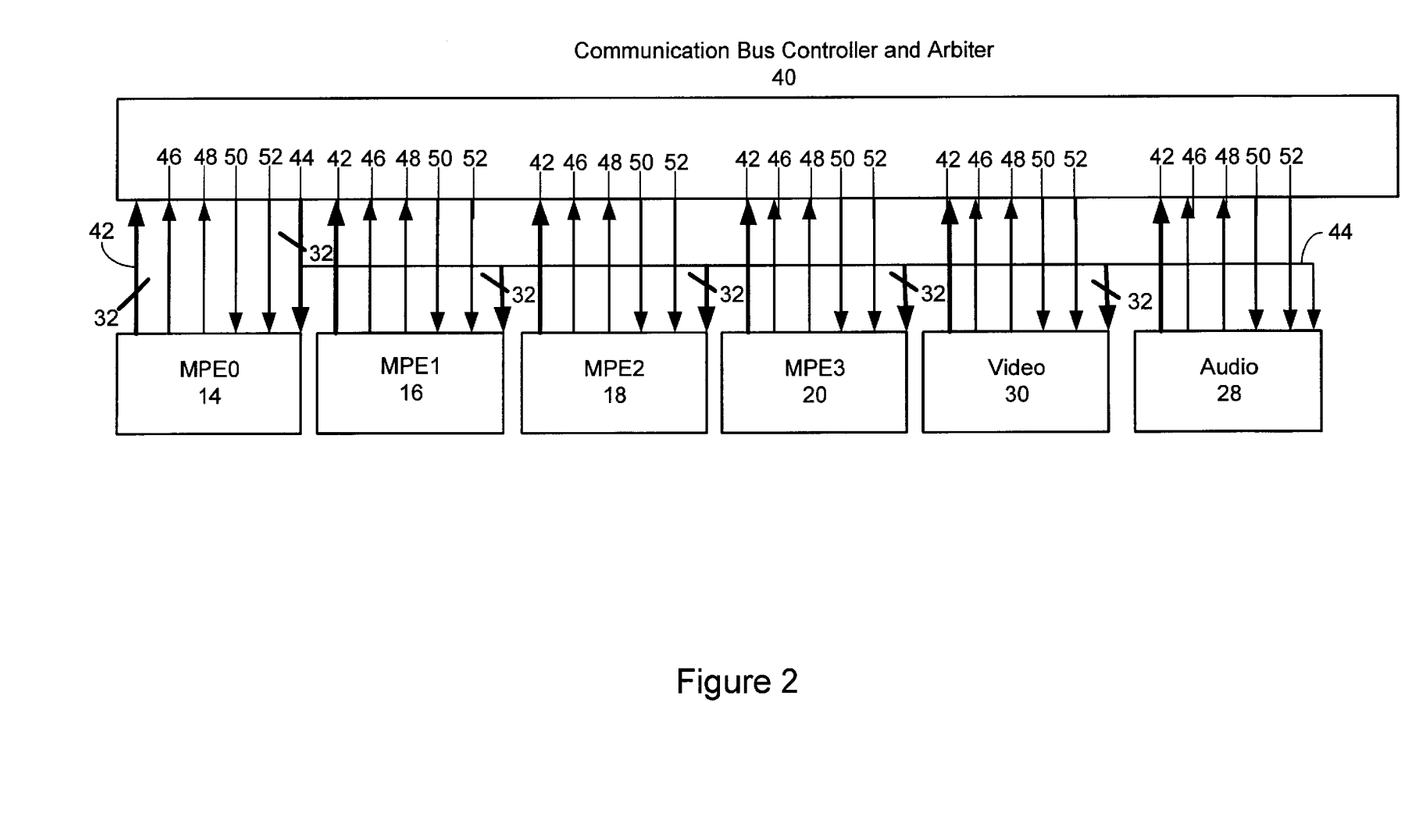
FIG. 2 is a block diagram showing how multiple processing units connect to the communication bus of the present invention.

Referring now to FIG. 2, a diagram of how processing units are connected to comm bus 12, and more particularly to comm bus arbiter 40 is shown. For illustration purposes only, FIG. 2 shows MPE0 14, MPE1 16, MPE2 18, MPE3 20, video unit 30 and audio unit 28 connected to comm bus arbiter 40. However, as one skilled in the art will appreciate, all processing units connected to comm bus 12 will be connected similarly. Each processing unit includes a 32-bit write bus connection 42 and a 32-bit read bus connection 44 to comm bus arbiter 40. The 32-bit write bus connections 42 are separate for each processing unit, but the 32-bit read bus connections 44 are multiplexed together, as shown in FIG. 2. That is, a single 32-bit read bus connection 44 connects all processing units to comm bus arbiter 40. In addition, each processing unit preferably includes 4 1-bit control signal connections 46, 48, 50 and 52. In accordance with one embodiment of the present invention, connection 46 corresponds to a comm_bus_req signal connection, connection 50 corresponds to a comm_bus_ack signal connection, connection 48 corresponds to a rec_buff_full signal connection, and connection 52 corresponds to a rec_en signal connection. The function of each control signal 46–52 will be discussed in more detail below.

Figure 3:
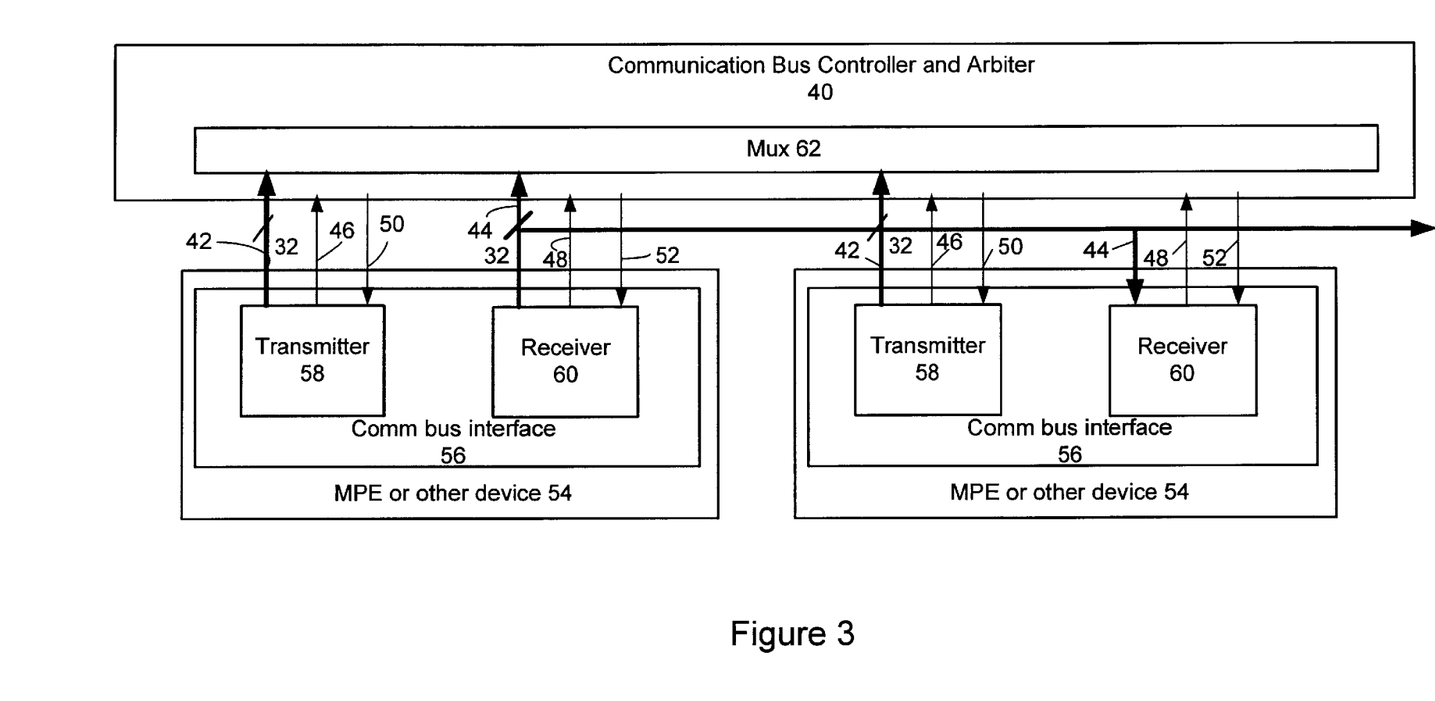
FIG. 3 is a more detailed block diagram of FIG. 2.

Referring now to FIG. 3, a more detailed diagram of how each processing unit is connected to comm bus arbiter 40 is shown. In accordance with the illustrated embodiment, each processing unit (referred to generically as processing unit 54 in FIG. 3) further comprises comm bus interface 56 which includes a transmitter interface 58 and a receiver interface 60. In addition, comm bus arbiter 40 includes a multiplexer (MUX) 62. Preferably, each of the 32-bit write bus connections 42 are connected between transmitter interface 58 of each processing unit 54 and MUX 62 of comm bus arbiter 40. In this regard, MUX 62 comprises a plurality of 32-bit inputs; one for each processing unit 54 connected to the comm bus. The output of MUX 62 is a single 32-bit read bus 44 connected to receiver interfaces 60 of each processing unit 54. Thus, MUX 62 is configured to receive a plurality of data write or transmit requests from one or more processing units 54, but only will process one at a time due to the single read bus connection 44.

As illustrated in FIG. 3, each transmitter interface 58 of processing units 54 includes 2 1-bit control signal connections to comm bus interface 40: (1) comm_bus_req control signal connection 46 from transmitter interface 58 to comm bus interface 40; and (2) comm_bus_ack control signal connection 50 from comm bus interface 40 to transmitter interface 58. Similarly, each receiver interface 60 of processing units 54 also includes 2 1-bit control signal connections to comm bus interface 40: (1) rec_buff_full control signal connection 48 from receiver interface 60 to comm bus interface 40; and (2) rec_en control signal connection 52 from comm bus interface 40 to receiver interface 60.

Referring now to Tables 1 and 2, the protocol for sending data packets over the communication bus will be discussed. The protocol starts when a transmitter interface 58 of a processing unit 54 sends a bus request to comm bus arbiter 40. Transmitter interface issues a bus request by setting comm_bus_req control signal 46 active. If multiple processing units 54 submit bus requests to arbiter 40 at or near the same time, arbiter 40 will arbitrate access to the bus by some predetermined protocol. For example, round-robin arbitration, or a priority scheme.

After transmitter interface 58 sends the bus request, processing unit 54 waits until it is granted access to the bus. As illustrated in Tables 1 and 2, processing unit 54 may wait from 0 to $L_{max}$ clock cycles before it is granted access to the bus; where $L_{max}$ is 5 clock cycles time the maximum number of simultaneously requesting units. As discussed in more detail below, the significance of 5 clock cycles is that it takes 5 clock cycles to fully transmit a communication packet (1 clock cycle for the 32-bit header and 4 clock cycles for the 128-bit data packet). At the end of a previous data transfer, but while some of the data of the previous transfer is still on the bus, comm bus arbiter 40 will send a bus acknowledge signal to the processing unit requesting the bus (see Tables 1 and 2). Comm bus arbiter 40 sends the bus acknowledge signal by setting comm_bus_ack control signal 50 active.

After comm bus arbiter 40 has granted the processing unit access to the bus, transmitter interface 58 sends a header packet, which includes a Target ID and a Sender ID, to comm bus arbiter 40. Upon receiving the header packet, comm bus arbiter 40 uses the Target ID to check whether the target processing unit can receive a data packet. That is, comm bus arbiter 40 checks rec_buff_full control signal 48 from the target processing unit. If rec_buff_full control signal 48 is not active, then the receive buffer in receiver interface 60 of the target processing unit is not full, and the target processing unit can receive the data packet. At this point, comm bus arbiter 40 keeps comm_bus_ack control signal 50 active and sets rec_en control signal 52 active. By keeping comm_bus_ack control signal 50 active, transmitter interface 58 of the transmitting processing unit will begin sending data packets to comm bus arbiter 40. Also, by activating rec_en control signal 52, comm bus arbiter 40 is instructing receiver interface 60 of the target processing unit to begin receiving data. As comm bus arbiter 40 receives data packets from the transmitting processing unit, it passes the data packets throughout to the target unit. To transmit a full 128-bit data packet, four separate 32-bit data packets are transmitted. Table 1 below illustrates the process of sending a data packet over the comm bus.

TABLE 1

| Requesting Unit Action | Bus Contents | Comm Bus Arbiter Action |
|---|---|---|
| Activate comm_bus_req | | |
| | ...0 - $L_{max}$ clock cycles previous transfer | Activate comm_bus_ack |
| Present target ID | Target ID and Sender ID | If rec_buff_full not active, keep comm_bus_ack active and activate rec_en |
| Present data | Data 1 | |
| | Data 2 | |
| | Data 3 | |
| | Data 4 | next bus acknowledge |
| | next transfer target ID | |

Referring now to Table 2, the processing protocol for when a receive buffer is full will now be described. If after comm bus arbiter 40 checks rec_buff_full control signal 48, the rec_buff_full control signal 48 is active, then the receive buffer in receiver interface 60 of the target processing unit is full or being filled, and thus cannot receive any more data. Since the target processing unit cannot receive the data from the transmitting unit, comm bus arbiter 40 will deactivate comm_bus_ack control signal 50, thus telling transmitter interface 58 of the transmitting processing unit not to send the data. In addition, comm bus arbiter 40 will not set rec_en control signal 52 active. Comm bus arbiter 40 then will begin processing the next communication bus request.

TABLE 2

| Requesting Unit Action | Bus Contents | Comm Bus Arbiter Action |
|---|---|---|
| Bus request | | |
| | ...0 - $L_{max}$ clock cycles previous transfer | Bus acknowledge |
| Present target ID | Target ID and Sender ID | If rec_buff_full active, deactivate comm_bus_ack, do not activate rec_en |
| | Idle | |
| | next transfer target ID | |

Figure 4:
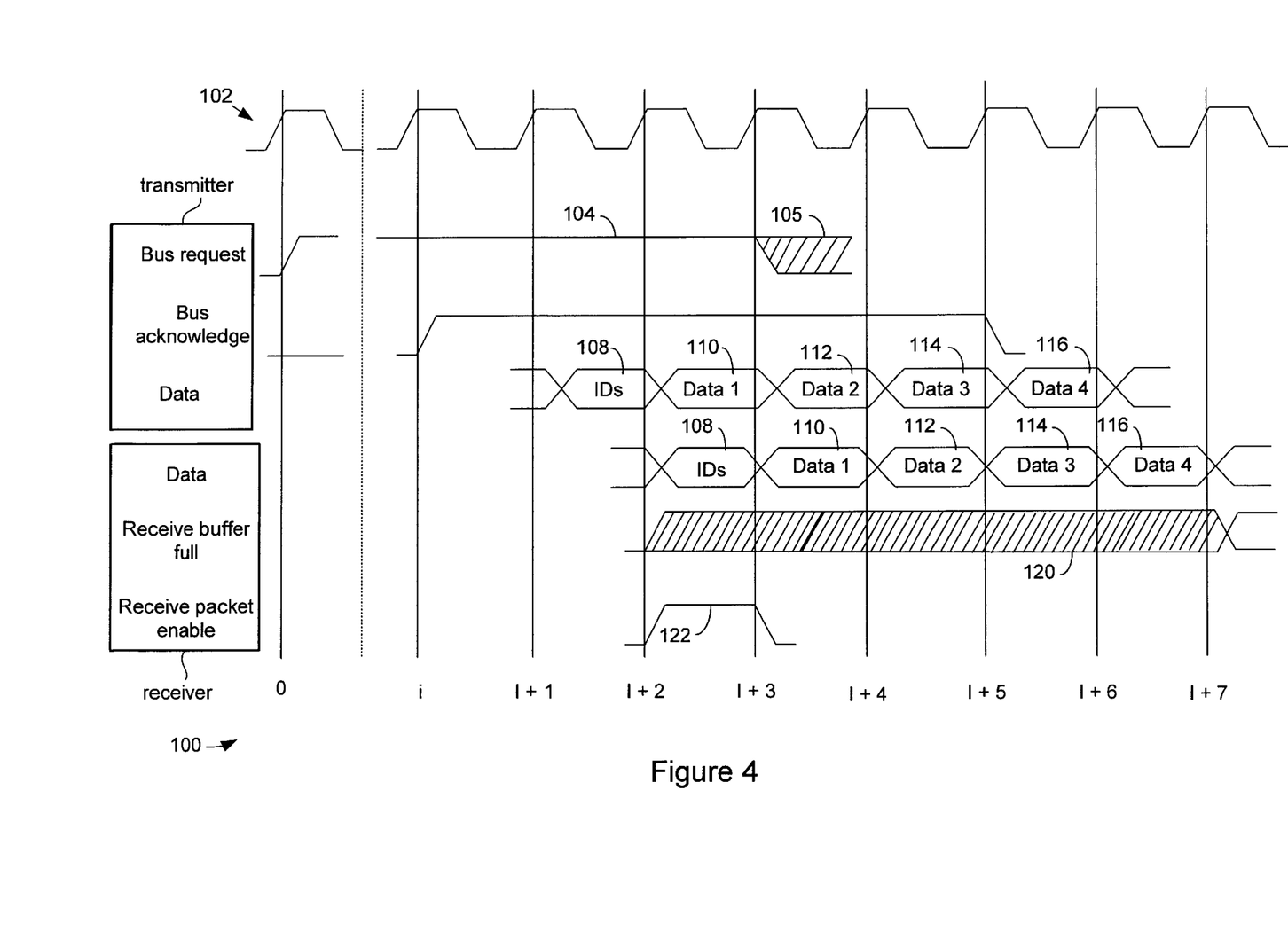
FIG. 4 is a clock timing diagram illustrating what happens when data is transmitted from one processing unit to another in accordance with the communication protocol of the present invention.
Figure 5:
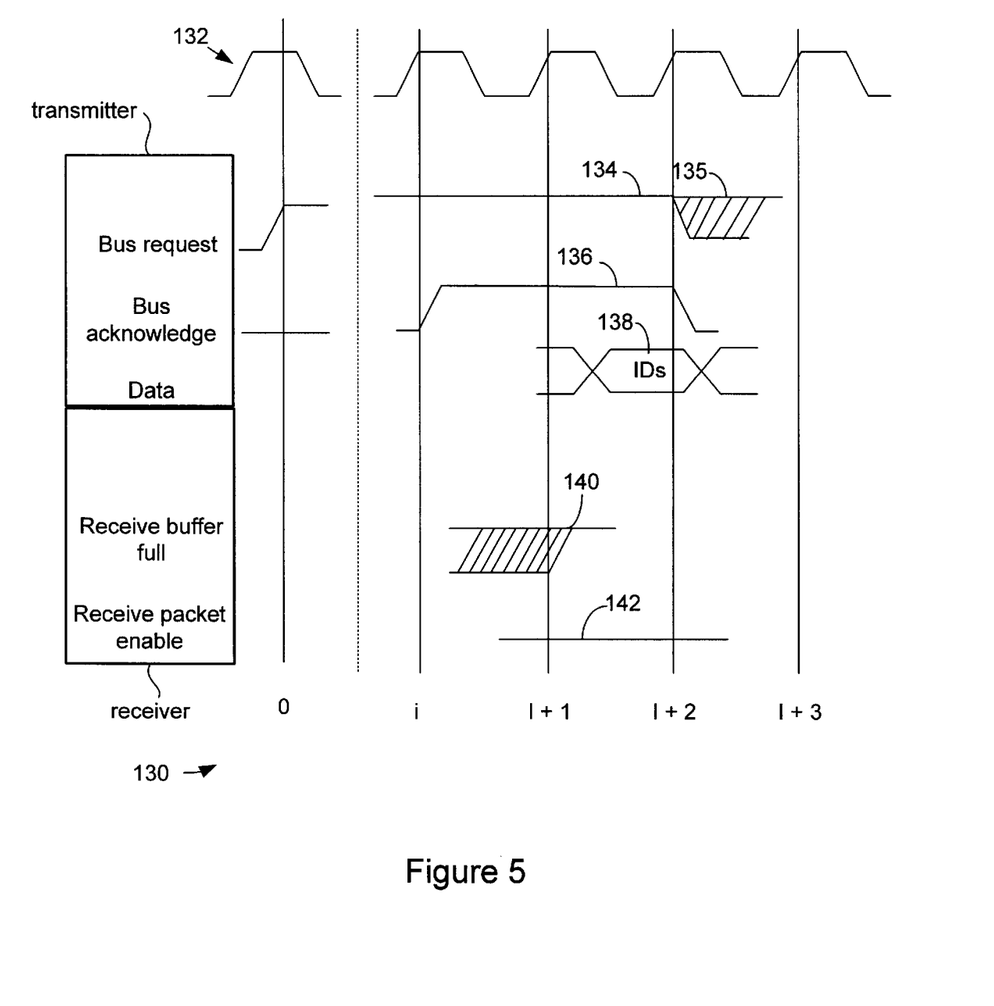
FIG. 5 is a clock timing diagram illustrating what happens when the receive buffer in a target device is full.

Referring now to FIGS. 4 and 5, the protocol for transmitting data over the communication bus in accordance with the present invention will be discussed with reference to the timing diagrams. FIG. 4 is a timing diagram 100 showing the timing of the control signals and data transfers when data transmission occurs. Clock cycles 102 are shown at the top of timing diagram 100. First, in order to transmit data, the transmitting processing unit sends a bus request by activating comm_bus_req control signal 104 at clock cycle 0. Control signal 104 stays active until comm bus arbiter 40 sends a comm_bus_ack control signal 106 at clock cycle L. As discussed above, L can be any number of clock cycles up to Lmax; where Lmax is 5 clock cycles times the maximum number of simultaneously requesting units. Upon receiving the comm_bus_ack control signal 106, transmitter interface 58 of the transmitting unit sends a Target ID and Sender ID to comm bus arbiter 40 (clock cycle L+1). Comm bus arbiter 40 then uses the Target ID to determine whether the target processing unit is able to receive the data. To do this, comm bus arbiter 40 checks the rec_buff_full control signal 118 at clock cycle position L+2.

As illustrated in FIG. 4, control signal 118 at clock cycle position L+2 is low or inactive, so the target device is able to receive data. The cross-hatched area 120 of control signal 118 is to illustrate that comm bus arbiter 40 does not care what the state of rec_buff_full signal 118 is after clock cycle position L+2. That is, once comm bus arbiter 40 has determined that the target unit can receive data, it does not care about the state of signal 118. Similarly, after comm bus arbiter 40 has determined that it can send the data, it is not concerned with the status of the comm_bus_req signal 104. This is illustrated by cross-hatched area 105. Also, if rec_buff_full signal 118 is inactive at clock cycle L+2, comm bus arbiter will activate rec_en signal 122 at or shortly after clock cycle position L+2. Signal 122 tells the target unit to begin receiving data.

If the target unit is able to receive data, comm bus arbiter 40 keeps comm_bus_ack signal 106 active, signaling transmitter interface 58 of the transmitting unit to send data packets. As illustrated in FIG. 4, data packets 110–116 are sent to comm bus arbiter 40 in 4 clock cycles; L+2–L+3, L+3–L+4, L+4–L+5, and L+5–L+6, respectively. Thus 4 32-bit data packets are sent in 4 clock cycles, for a total of 128 bits. Upon receiving data packets 110–116, comm bus arbiter 40 forwards the data packets to receiver interface 60 of the target unit. Transmission from arbiter 40 to the target unit begins as soon as arbiter 40 receives the first data packet. Given that it takes 1 clock cycle to transmit the first data packet from the transmitting unit to arbiter 40, transmission of the data packets to the target unit begins at L+3 and continues until L+7. As shown in FIG. 4, once arbiter 40 begins receiving the final data packet 116, arbiter 40 deactivates comm_bus_ack signal 106, so that the arbiter can begin processing the next comm bus request.

Referring now to FIG. 5, timing diagram 130 is shown illustrating the timing of the control signals and data transfers when the receive buffer in the target processing unit is full. Clock cycles 132 are shown at the top of timing diagram 130. As discussed above with reference to timing diagram 100, in order to transmit data, the transmitting processing unit sends a bus request by activating comm_bus_req control signal 134 at clock cycle 0. Control signal 104 stays active until comm bus arbiter 40 sends a comm_bus_ack control signal 136 at clock cycle L. Upon receiving the comm_bus_ack control signal 136, transmitter interface 58 of the transmitting unit sends a Target ID and Sender ID to comm bus arbiter 40 (clock cycle L+1–L+2). Comm bus arbiter 40 then uses the Target ID to determine whether the target processing unit is able to receive the data. To do this, comm bus arbiter 40 checks the rec_buff_full control signal 140 at clock cycle position L+2. In this case, rec_buff_full signal 140 is active at clock cycle position L+2, signaling that the receive buffer is full or being filled, and thus, the target processing unit cannot receive data. Accordingly, comm bus arbiter 40 deactivates comm_bus_ack signal 136 at clock cycle position L+2, which instructs the transmitting device to not send data. In addition, arbiter 40 does not active rec_en signal 142. By deactivating comm_bus_ack signal 136, arbiter 40 is able to receive the next communication bus request from another device or from the same device.

As illustrated in Table 3, each comm bus interface 56 of processing units 54 connected to comm bus arbiter 40 include various control fields used to facilitate communication with the bus. The configuration and function of each of the control fields is described in Table 3.

TABLE 3

| Bits | Read/Write | Description |
| --- | --- | --- |
| 0–7 | RW | Transmit target ID. This will be used for the next data to be written into the transmit data buffer. |
| 12 | RW | Transmit bus lock flag. When a transmitter sets this bit, the communication bus will be locked to this transmitter until this bit is cleared. This allows one transmitter to have the maximum possible communication bus bandwidth available to it. (Only the MPEs have this bit.) This is potentially dangerous to performance, as all other communication bus traffic is locked out while this bit is set; and so this should be used with extreme care. |
| 13 | RW | Transmit retry flag. When this flag is set, the hardware will continue to attempt to transmit the data until the transmission is successful. If this bit is cleared while the transmit buffer is full, then the transmit buffer full flag should be polled until it is clear indicating that the transmitter has stopped retrying. When it is clear the transmit failed flag should be tested to determine if the last transmit attempt succeeded or failed. |
| 14 | R | Transmit failed. when the transmit retry flag is clear, this flag will be set when a transmit attempt fails because the receive buffer is full. This flag is cleared when the transmit data register is next written. |
| 15 | R | Transmit buffer full. This flag indicates that the hardware is attempting to transmit the data in the transmit data buffer to the transmit target ID. If the retry flag is set then this bit will remain set until a successful transmission attempt, and the transmit failed flag will reflect what happened. |
| 16–23 | R | Received source ID. This indicates the communication bus ID of the last data packet to be received. This value should be read before the receive data buffer, as another packet might be received as soon as the receive buffer is empty. |
| 30 | RW | Receive disable. this flag should be set to prevent reception. All transmit attempts to this receiver will fail while this flag is set.. If this flag is set while the receive buffer is empty, the receive buffer full flag should be checked afterwards, in case a packet was received just before this flag was set. |
| 31 | R | Receive buffer full. This flag indicates that there is a received packet in the receive data buffer and the received source ID fields. This flag is cleared (and these fields can then be over-written) when the receive buffer is read. |

In conclusion, the present invention provides a novel communication bus and bus protocol for connecting multiple processing units in a multi-processing unit system. While a detailed description of presently preferred embodiments of the invention has been given above, various alternatives, modifications, and equivalents will be apparent to those skilled in the art. For example, while the communication bus is disclosed herein with reference to a particular media processing system, one skilled in the art will appreciate that the communication bus of the present invention can be used with any multi-processing unit system without varying from the spirit of the invention. Therefore, the above description should not be taken as limiting the scope of the invention, which is defined by the appended claims.

What is claimed is:

1. An a synchronous low latency method of communicating data packets between a number of processing units that includes a first processing unit and a second processing unit over a communication bus such that the first and the second processor communicate directly with each other, comprising:

sending a communication bus request to a bus arbiter by a first processing unit;

if the communication bus is open for communication, then granting the first processing unit access to the bus by the bus arbiter;

sending a header packet to the bus arbiter by the first processing unit then wherein the header packet includes a target ID;

determining if a second processing unit associated with the target ID is able to receive data from the first processing unit by the bus arbiter;

if the second processing unit is able to receive data then, sending a data packet to the bus arbiter by the first processor; and sending the data packet to the second processing unit by the bus arbiter.

2. A method as recited in claim 1, wherein the data packet is a 128 bit data packet and the header packet is 32 bits.

3. A method as recited in claim 2, wherein the 128 bit data packet is sent in 4 separate 32-bit packets requiring approximately 5 clock cycles to send the 128 bits of data to the second processing unit.

4. A method as recited in claim 1, wherein the number of processing units central processing units (CPUs), processors, ROM interfaces, DMA controllers, system bus interfaces, co-processors, multi-media hardware assist units, audio and video input and output interfaces, and peripheral devices.

5. A method as recited in claim 1, wherein each processing unit includes a transmitter interface.

6. A method as recited in claim 5, wherein the transmitter interface performs the sending a communication bus request to a bus arbiter by the first processing unit.

7. A method as recited in claim 6, wherein each processing unit includes a receiver interface.

8. A method as recited in claim 7, wherein the bus arbiter determining whether the second processing unit is able to receive data further comprises determining whether the receiver interface has set a receive buffer full signal active.

9. A method as recited in claim 1, further comprising:

coupling each of the processors to the communication bus by, connecting a separate write bus connection between each of the processors and the communication bus, multiplexing a single read bus connection between each of the processors and the communication bus, and connecting a separate control signal line between each processor and the communication bus.

10. A method as recited in claim 9, wherein the bus arbiter further comprising:

a multiplexor unit coupled to each of the write bus connections having an output connected to the single read bus such that the multiplexor unit is configured to receive a plurality of data write or transmit requests from one or more of the processing units but only processes a single data write or a single transmit request at a time.

11. An apparatus for providing a low latency communication of data packets between a number of processing units that includes a first processing unit and a second processing unit over a communication bus such that the first and the second processor communicate directly with each other, comprising:

means for sending a communication bus request to a bus arbiter by a first processing unit;

means for granting the first processing unit access to the bus by the bus arbiter;

means for sending a header packet to the bus arbiter by the first processing unit then wherein the header packet includes a target ID;

means for determining if a second processing unit associated with the target ID is able to receive data from the first processing unit by the bus arbiter;

means for sending a data packet to the bus arbiter by the first processor; and means for sending the data packet to the second processing unit by the bus arbiter.

12. An apparatus as recited in claim 11, wherein the data packet is a 128 bit data packet and the header packet is 32 bits.

13. An apparatus as recited in claim 12, wherein the 128 bit data packet is sent in 4 seperate 32-bit packets requiring approximately 5 clock cycles to send the 128 bits of data to the second processing unit.

14. An apparatus as recited in claim 11, wherein the number of processing units central processing units (CPUs), processors, ROM interfaces, DMA controllers, system bus interfaces, co-processors, multi-media hardware assist units, audio and video input and output interfaces, and peripheral devices.

* * * * *